(12) United States Patent
Hendrickx

(10) Patent No.: US 12,441,527 B2
(45) Date of Patent: Oct. 14, 2025

(54) DRUM FOR TRANSPORTING AND/OR STORING BATTERIES AND THE USE OF SUCH A DRUM

(71) Applicant: BEBAT VZW, Tienen (BE)

(72) Inventor: Hendrik Hendrickx, Tienen (BE)

(73) Assignee: Bebat Vzw, Tienen (BE)

( * ) Notice: Subject to any disclaimer, the term of this patent is extended or adjusted under 35 U.S.C. 154(b) by 611 days.

(21) Appl. No.: 17/653,141

(22) Filed: Mar. 2, 2022

(65) Prior Publication Data

US 2022/0281659 A1 Sep. 8, 2022

(30) Foreign Application Priority Data

Mar. 4, 2021 (BE) .................................. 2021/5165

(51) Int. Cl.
| | | |
|---|---|---|
| *B65D 51/16* | (2006.01) | |
| *B65D 8/00* | (2006.01) | |
| *B65D 25/14* | (2006.01) | |
| *B65D 25/34* | (2006.01) | |
| *B65D 51/18* | (2006.01) | |
| *B65D 79/00* | (2006.01) | |
| *B65D 85/68* | (2006.01) | |

(52) U.S. Cl.
CPC ......... *B65D 51/1638* (2013.01); *B65D 7/045* (2013.01); *B65D 25/14* (2013.01); *B65D 25/34* (2013.01); *B65D 51/18* (2013.01); *B65D 79/0087* (2020.05); *B65D 85/68* (2013.01); *B65D 2251/0018* (2013.01); *B65D 2251/0031* (2013.01); *B65D 2251/0093* (2013.01); *B65D 2585/88* (2013.01); *B65F 2240/108* (2013.01)

(58) Field of Classification Search
CPC ........ B65D 2251/0031; B65D 2585/88; B65D 79/0097; B65D 51/1638; B65D 79/0087; B65F 2240/108; H01M 50/342; H01M 50/3425; H01M 50/383; H01M 50/20–298
USPC .......................................................... 429/56
See application file for complete search history.

(56) References Cited

U.S. PATENT DOCUMENTS

| | | | | |
|---|---|---|---|---|
| 5,955,127 | A * | 9/1999 | Glaser ................ | B65D 79/0087 426/123 |
| 6,497,978 | B1 * | 12/2002 | Takada .............. | H01M 50/3425 429/57 |
| 11,001,430 | B2 * | 5/2021 | Stewart ................ | B65D 75/525 |
| 2006/0275657 | A1 * | 12/2006 | Kozuki ............. | H01M 10/0587 429/185 |

(Continued)

FOREIGN PATENT DOCUMENTS

| | | | |
|---|---|---|---|
| DE | 102014016477 A1 | | 5/2016 |
| FR | 3114917 A1 | * | 4/2022 |

*Primary Examiner* — Allan D Stevens
(74) *Attorney, Agent, or Firm* — Tatonetti IP

(57) ABSTRACT

A drum for transporting and/or storing batteries, the drum having an internal storage space having a volume, and the drum being provided with a lid to close off the storage space The lid is provided with one or more openings for venting gas from the storage space to the atmosphere. One or more openings have a total surface area of at least 1.0 square centimeter per liter volume of the storage space. On an outside of the lid is at least one sheet of foil which covers a first group of two or more of said openings, in which the sheet of foil is connected to the lid completely around the first group of openings.

13 Claims, 4 Drawing Sheets

(56) References Cited

U.S. PATENT DOCUMENTS

| | | | |
|---|---|---|---|
| 2007/0009785 A1* | 1/2007 | Kozuki | H01M 50/171 |
| | | | 429/185 |
| 2012/0205381 A1* | 8/2012 | Madai | B65D 77/225 |
| | | | 156/87 |
| 2013/0095356 A1* | 4/2013 | Shimizu | H01M 50/519 |
| | | | 429/88 |
| 2014/0248814 A1* | 9/2014 | Handermann | E04C 2/16 |
| | | | 442/326 |
| 2015/0064514 A1* | 3/2015 | Wu | H01M 50/293 |
| | | | 429/120 |
| 2017/0237054 A1* | 8/2017 | Mast | H01M 50/383 |
| | | | 320/107 |
| 2017/0328695 A1 | 11/2017 | Keller | |
| 2018/0026245 A1* | 1/2018 | Page | H01M 50/394 |
| | | | 429/82 |
| 2018/0229907 A1* | 8/2018 | Gayer | B65D 51/20 |
| 2020/0101334 A1* | 4/2020 | Vandemark | A62C 3/002 |
| 2021/0296682 A1* | 9/2021 | Fauteux | H01M 10/0525 |
| 2022/0024674 A1* | 1/2022 | Vandemark | B65D 77/0426 |
| 2023/0010716 A1* | 1/2023 | Paczkowski | H01M 50/227 |
| 2023/0145109 A1* | 5/2023 | Lee | A62C 99/0045 |
| | | | 429/53 |

\* cited by examiner

DRUM FOR TRANSPORTING AND/OR STORING BATTERIES AND THE USE OF SUCH A DRUM

CROSS-REFERENCES TO RELATED APPLICATIONS

This Non-Provisional Patent Application claims the benefit of and priority to Belgian Patent Application Serial No. BE 2021/5165, filed Mar. 4, 2021, entitled "Drum for Transporting and/or Storing Batteries and the Use of such a Drum," the entire contents which is hereby incorporated herein by reference.

BACKGROUND

The present invention relates to a drum for transporting and/or storing batteries or devices containing batteries and a method for transporting and/or storing batteries or devices containing batteries using said drum.

In particular, this concerns used batteries which are collected at collection points such as shops, and which are placed in said drum during the collection. When the drum is full, it is closed off and subsequently transported to process or recycle the batteries. It should be taken into account that the batteries may be defective or visibly or invisibly damaged.

Lithium batteries in particular can be potentially unstable, for example as a result of a misuse or as a result of mechanical damage or short-circuit. They can heat up, generating combustible gases, which can obviously be ignited by the heat of reaction. These lithium batteries are rechargeable and non-rechargeable lithium batteries with different chemical compositions.

These lithium batteries each consist of one or more coupled electrochemical cells. As a result, such undesired spontaneous ignition may also result in spontaneous ignition in an adjacent cell or battery. Such an event is better known in the art under the English term 'thermal run-away'.

Due to the increasing fraction of lithium batteries that are to be processed and/or recycled, the risk of a chain reaction as a result of individual spontaneous ignition increases. Therefore, containers, such as drums, which are normally required to be closed off due to legal regulations regarding transport and storage of used batteries, can explode due to the development and ignition of flammable gases.

Since the development of combustible gases occurs per battery cell, and transfer of heat between cells occurs relatively slowly, such ignition of a batch of batteries is a relatively slow process, but nevertheless fast enough to enable an explosion of said drum.

According to the state of the art, separate plastic inner bags are first placed in the known drums. This is necessary due to legal regulations, in particular ADR (European Agreement Concerning the International Carriage of Dangerous Goods by Road).

The disadvantage is that these bags are also prone to spontaneous ignition themselves because batteries short-circuit with other batteries, especially because the poles of an LR-61 (Alkaline Round) battery are short-circuited by a button cell and can therefore cause a large heat development in the button cell, but also by other short-circuits between batteries and even between cells in a single battery. Such plastic inner bags are thus a risk factor for the development of a fire from a short-circuit.

A drum for storing airbag inflators is known from US2017/0328695A1. This known drum is provided with a sheet of plastic which extends over the entire lid and which is attached to the drum itself, in order to avoid moisture entering the drum.

SUMMARY

In order to avoid or reduce these drawbacks, the invention relates to a drum, preferably a steel drum, for the transport and/or the storage of batteries, the drum having an internal storage space, the storage space having a volume, the drum being provided with a lid to close off the storage space, wherein the lid is provided with one or more openings for venting gas from the storage space to the atmosphere.

This has the advantage that gas, released if a quantity of batteries in the storage room ignites, can escape safely without reaching an internal pressure that could cause an explosion of the drum.

Preferably, the one or more openings have a total surface area of at least 1.0 square centimeter per liter of volume of the storage space, such that the gas can escape quickly enough.

Preferably, on the outside of the lid at least one sheet of foil is present extending accross a first group of two or more of said openings, wherein the sheet of foil is connected to the lid completely around the first group of openings, more particulary is only connected to the lid around the first group but not between the openings of the first group.

Preferably, accross all said openings a said sheet of foil extends

A sheet of foil can alternatively be described as a film sheet or a piece of foil that extends over a certain area.

Such a foil tears as a result of the internal pressure during a starting fire before the drum itself is damaged.

At the same time, the foil ensures that, during normal use of the drum, no water, for example rainwater, can enter the storage space through the openings.

In other words, the invention relates to the conflicting requirements that no rainwater should be able to enter the storage space via the openings, but that gas must be able to escape via the openings if the pressure in the storage space rises to a higher level than is safe. This is achieved by the foil.

Due to the fact that the sheet of foil is attached to the lid itself, fewer acts are needed to close the drum and errors in application of the sheet of foil are avoided.

In a preferred embodiment, the foil is a plastic foil. This makes the foil cheap and water-resistant for a long period of time.

In a preferred embodiment, the sheet of foil is attached to the lid completely around the one or more openings by the sheet of foil being adhered to the outside of the lid.

In a preferred embodiment, the sheet of foil is a sticker with a cover layer, the cover layer being removed at the locations where the sheet of foil is attached to the lid.

Both embodiments have the advantage that they can be realized very easily, and that the layer of foil can easily be replaced, if necessary, for instance in the event of damage.

Obviously, an adhesive is used which is suitable for having a good adhesive effect for a long period, i.e. several years, and which is resistant to water, grease and solvents.

Preferably, the foil has a dimensional stability, measured according to standard FINAT TM 14 (Fédération Internationale des fabricants et transformateurs d'Adhésifs et Thermocollants Test Method), which is less than 0.5 mm in any direction, and preferably less than 0.2 mm.

In a preferred embodiment, the sheet of foil is designed to tear or break if the difference between the pressure on the inside of the lid and the atmospheric pressure is greater than a threshold value. In this case, the threshold value is preferably 50000 Pa or less, and preferably 25000 Pa or less.

This allows to execute the foil, in particular its size and thickness and nature, in such a way that it corresponds to the maximum pressure for which the remainder of the drum is designed.

In a preferred embodiment, the sheet of foil has a first partial surface with which the sheet of foil is connected to the remainder of the lid, wherein the sheet of foil has a second partial surface which is completely surrounded by the first partial surface, and which is not directly but only via the first partial surface connected to the remainder of the lid.

Preferably, the second partial surface has a perimeter C and a surface A, wherein the foil has a tensile strength of T, wherein C, A, and T respectively have the units m, $m^2$, and N/m respectively, wherein the tensile strength T is determined in one of the following two ways:
1) The tensile strength T is measured on the relevant type of foil;
2) A tensile strength X in units $N/m^2$ is measured on the material from which the relevant type of foil is manufactured, and the tensile strength T is calculated by multiplying the tensile strength X by the thickness of the foil, wherein T <50000*(A/C), and preferably wherein T <30000*(A/C).

In a preferred embodiment, the drum has a circular lid with a diameter of 45 cm or less, where (A/C) is >0.035 m.

In a preferred embodiment, the drum has a circular lid with a diameter of 45 cm or less and the foil has a tensile strength T <2500 N/m, and preferably <1800 N/m.

In a preferred embodiment, the drum comprises a drum body, the drum body containing the storage space, the drum body being provided on its inside with an epoxy resin coating.

Preferably, the lid is also provided on its inside with an epoxy resin coating.

As a result, the wall of the drum is electrically insulating on the inside and it is therefore possible to use the drum without a plastic inner bag for storing and transporting used batteries.

In a preferred embodiment, at most four sheets of foil are present on the outside of the lid, and preferably exactly one sheet of foil. The latter therefore means that all openings jointly form one first group, in other words that one sheet of foil extends on the outside of the lid across all of said openings, wherein the sheet of foil is connected to the lid completely around the openings, but not between the openings.

If there are many individual sheets of foil, the foil will have to be chosen to tear very easily. After all, the force exerted by gases in the storage space on the layer of foil is proportional to the surface of the sheet of foil, while the resistance to tearing at a given force is proportional to its perimeter.

As a result, if the foil is relatively strong, it will not tear if the openings are covered individually or if there are many first groups. Obviously, this is undesirable.

However, it is desirable to use a relatively strong foil to ensure that it lasts a long time and cannot be easily damaged during normal use of the drum.

The use of only a limited number of sheets of foil allows to use a stronger, and therefore more durable, foil than would otherwise be the case, while still obtaining the same level of protection.

To this end, in a preferred embodiment, the foil has a tensile strength T >300 N/m.

In a preferred embodiment, the drum is provided with a layer of gas-permeable flame-retardant material extending across the one or more openings. This can be either above or below the one or more openings.

This prevents flames, which usually arise when batteries ignite, from passing through the openings outside the drum and causing damage or igniting other objects.

In a preferred embodiment, the flame-retardant material is made of steel fibers or mineral fibers, and more preferably is a mineral wool or a steel wool or a textile made of steel fibers or mineral fibers. This is a practical way of forming such a layer of flame-retardant material. Mineral wool is a collective name for glass wool and rock wool, wherein the rock wool can be based on various different types of minerals.

In a preferred embodiment, the flame-retardant material has a porosity which is at least 80 volume %, and which is preferably at least 90 volume %, and more preferably at least 95 volume %. As a result, the openings are not or hardly limited in their ability to allow gas to pass through.

In a preferred embodiment, the layer of flame-retardant material extends parallel to the lid, in other words, horizontally or substantially horizontally when the lid is placed on the drum, the layer of flame-retardant material having a thickness that is 40 mm or less, and preferably 20 mm or less.

In a preferred embodiment, the layer of flame-retardant material has a mass that is at least 0.75 grams, and preferably at least 1.0 grams, per liter of volume of the storage space. As a result, the flame-retardant material has sufficient capacity to absorb the heat of a flame, such as can arise when a batch of batteries is ignited, such that the flame is not only extinguished, but also such that the relevant gases have cooled down to such an extent that they do not re-ignite spontaneously and/or can ignite other objects.

In a preferred embodiment, the flame-retardant material is made of fibers, wherein the average diameter of the fibers is at most 0.5 mm, and preferably at most 0.25 mm. This allows that sufficient fiber surface is present to absorb the heat of a possible flame, such that said flame is extinguished.

In a preferred embodiment, two or more of the openings, and preferably all of said openings, are provided with a common layer of flame-retardant material, such that the container can be easily manufactured. In this case, the joint layer of flame-retardant material also extends at the location of parts of the relevant wall which are located between the one or more openings.

In a preferred embodiment, the one or more openings have an individual area that is at least 0.04 $cm^2$. This ensures that sufficient gas can be vented.

In a preferred embodiment, the one or more openings have an individual surface area that is at most 9 $cm^2$ and preferably at most 5 $cm^2$ and more preferably at most 2.5 $cm^2$, such that individual batteries do not fit or cannot fit easily through the openings and thus cannot be ejected out of the drum in a violent spontaneous ignition.

In a preferred embodiment, the lid, at the location of the one or more openings, has at least three layers, wherein a first layer and a second layer are both provided with said one or more openings and are made of metal sheet, wherein a third layer is formed by the layer of flame-retardant material, wherein the layer of flame-retardant material is arranged between the first layer and the second layer.

Preferably, the lid, at the location of the one or more openings, has at least four layers wherein a fourth layer is formed by the sheet of foil.

Preferably, the first layer and the second layer are made of steel and are attached to one another by means of clinching.

This is an easy way to keep the flame-retardant material layer in a desired position, in particular by placing it between the first layer and the second layer.

Preferably, the one or more openings have a total area of at least 2.0 square centimeters per liter volume of the storage space.

The invention also relates to the use, for the storage or the transport of batteries, of a drum according to the invention.

In a preferred embodiment, the storage space contains one or more used batteries, wherein the storage space is closed off by the lid. Preferably, the storage space is hereby filled to at least 25% by volume, and more preferably to at least 40% by volume, with used batteries, including lithium batteries.

Preferably, the volume of the storage space is at least 20 L and more preferably at least 30 L. Preferably, the volume of the storage space is 100 L or less and more preferably 75 L or less.

Preferably, during use, the storage space is filled at least partially with batteries, preferably used batteries, and the storage space is closed off by the lid.

The quantity of batteries is preferably at least 0.1 kg per liter of volume of the storage space. In this case, the batteries preferably comprise one or more lithium batteries.

BRIEF DESCRIPTION OF THE DRAWINGS

In order to clarify the invention, a preferred embodiment of a drum according to the invention is described below, with reference to the following figures, wherein 1)

DETAILED DESCRIPTION

Figure 1:
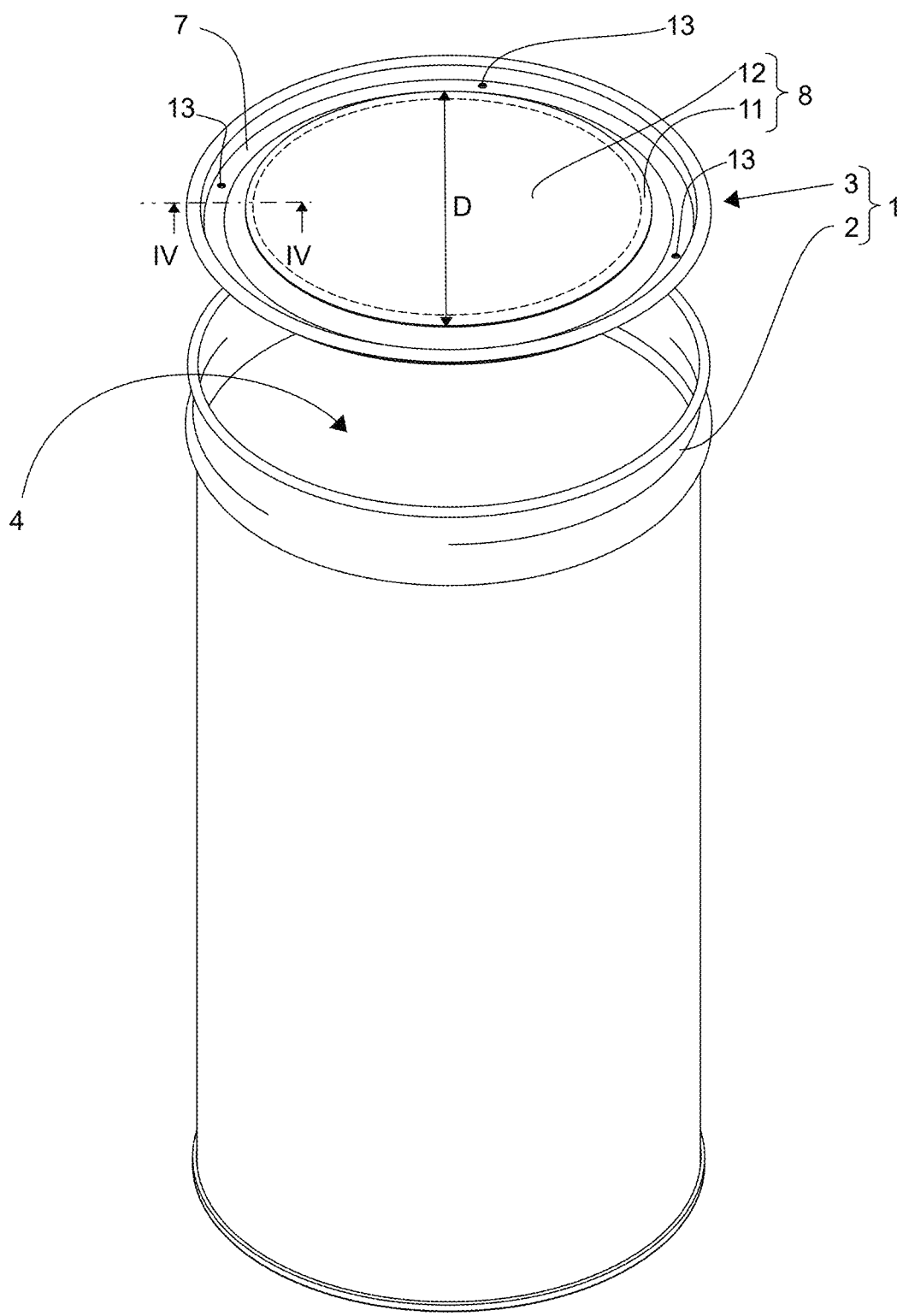
FIG. 1 shows a perspective view of a drum according to the invention;
2)
Figure 2:
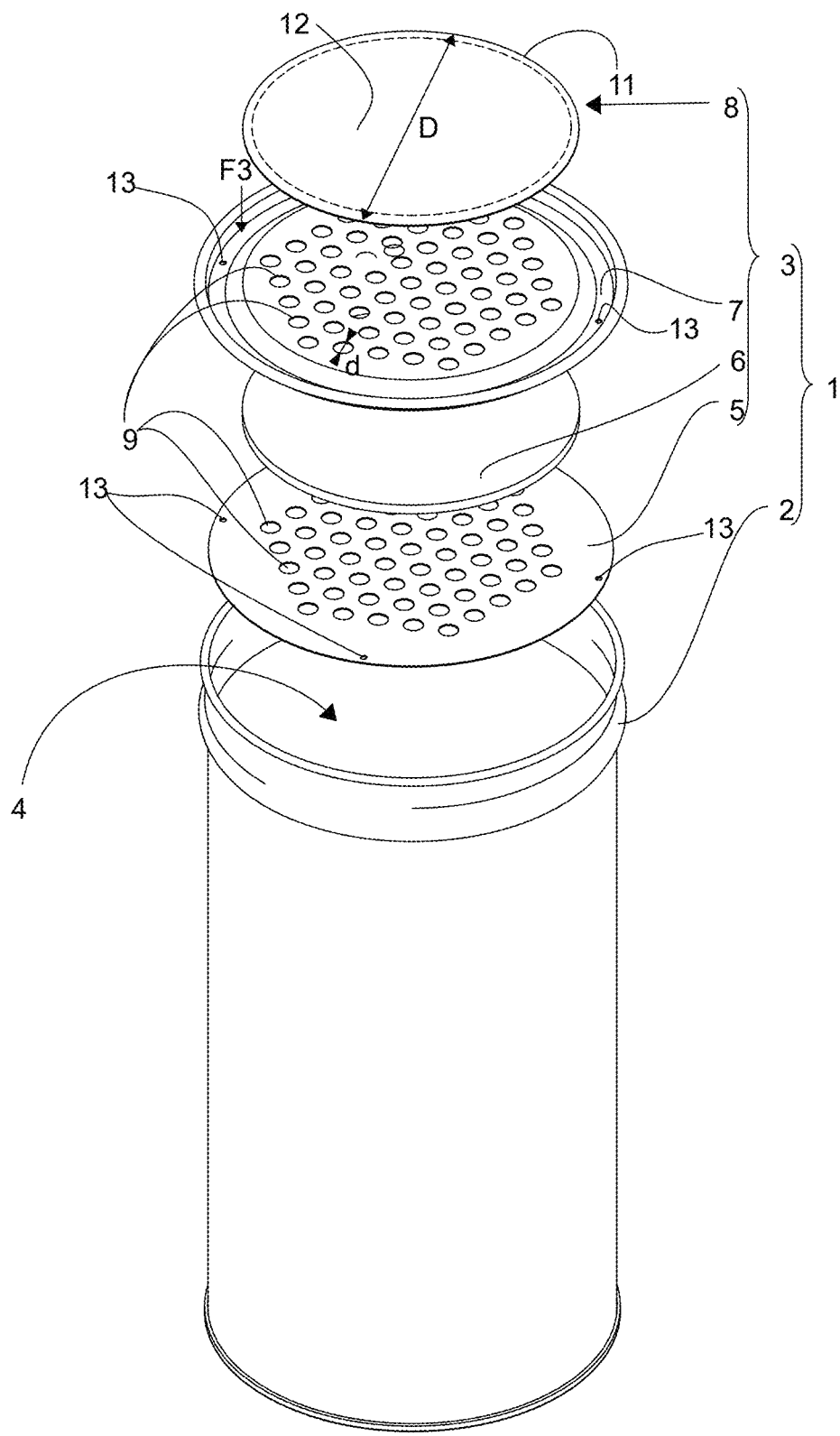
FIG. 2 shows an exploded view of the drum of FIG. 1;
3)
Figure 3:
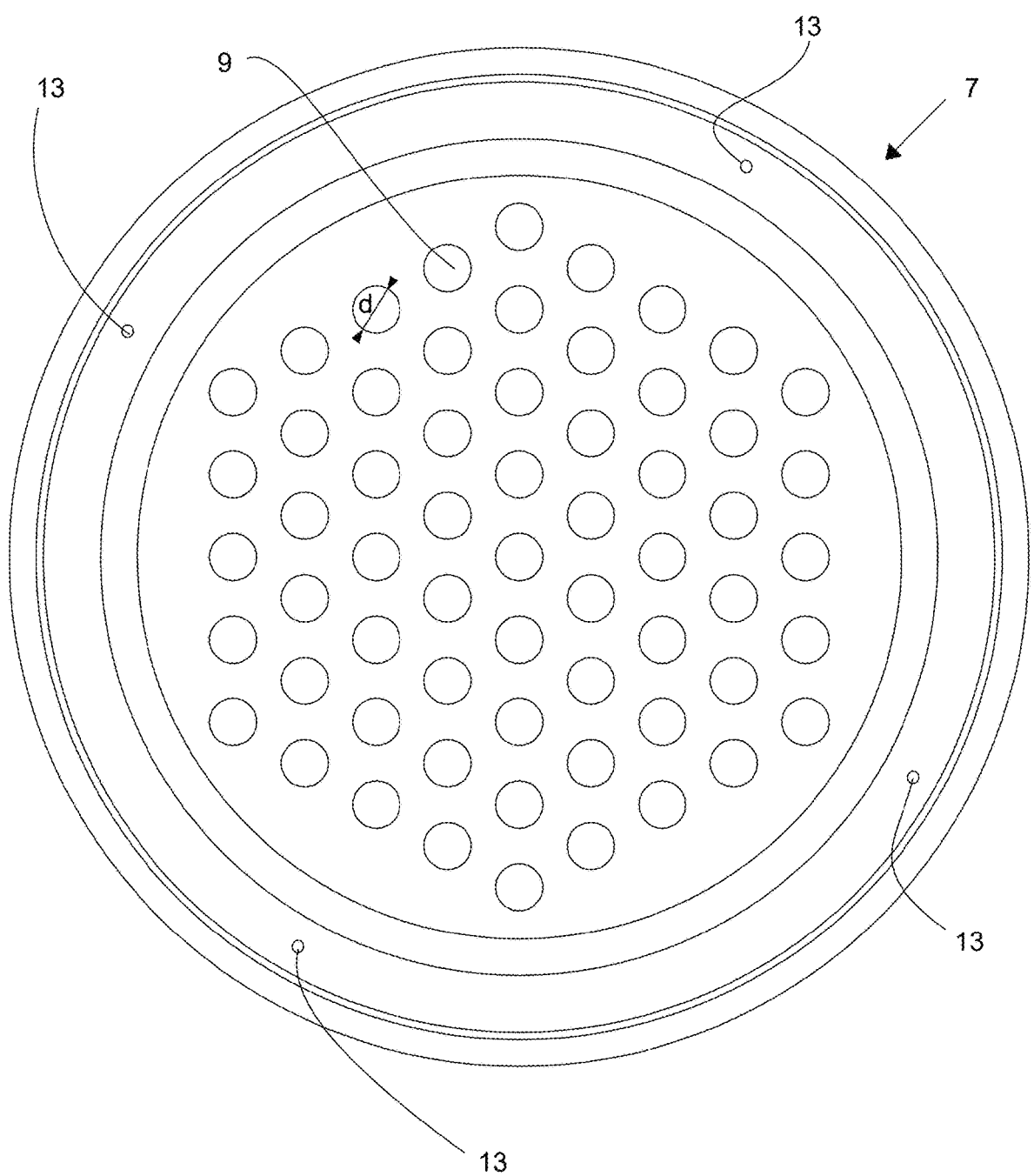
FIG. 3 shows a part of the drum of FIGS. 1 and 2 in top view according to F3;
4)

The drum 1 shown in the figures mainly consists of a cylindrical drum body 2 and a circular lid 3. The drum body 2 is mainly made of bent sheet steel and defines an internal storage space 4 for articles, in this case used batteries. The drum 1 is coated on its entire inside with a surface layer of epoxy resin with a thickness of about 9 μm.

The drum 1 has an external diameter of 35 cm and a volume of 53 liters.

The drum 1 is designed such that the drum 1 in a state where the lid 3 is mounted on the drum body 2 and secured with a tightening ring, can withstand an internal pressure of 50000 Pa above atmospheric pressure without damage.

The lid 3 consists of four main parts, i.e. four layers, i.e. from bottom to top, a bottom plate 5, a layer of steel wool 6 with a thickness of 10 mm, made of stainless steel or inox, a top plate 7, and a circular sheet of plastic foil 8 with a diameter D of 259 mm.

The top plate 7 is shaped to fit snugly on the drum body 2 and is similar to a traditional drum lid.

The underside of the bottom plate 5 is coated with the same surface layer of epoxy resin as the inside of the drum body 2.

The bottom plate 5 and the top plate 7 are each provided over a large part of their surface with a regular pattern of sixty-one circular openings 9, each with a diameter d of 16 mm. The openings 9 in the bottom plate 5 are located exactly below the openings 9 in the top plate 7.

The openings 9 have a total passage area of $61*0.25*\pi*(16\ mm)^2$, which corresponds to 118 cm².

The steel wool 6 is made of fibers with an average diameter of 30 μm. The layer of steel wool 6 has a mass of 1200 g/m² at said thickness of 10 mm, and a free volume between the fibers of 98.5 volume %. The layer of steel wool 6 has a diameter of 259 mm and a total mass of 63 g.

The sheet of plastic foil 8 is designed as a self-adhesive sticker with an adhesive layer and a cover layer 10 covering the adhesive layer, wherein the cover layer 10 is removed at the outermost 9 mm such that the adhesive layer of the sticker is exposed in an annular shape, and is adhered to the top plate 7 completely around the openings 9, but not between them.

As a result, the sheet of plastic foil 8 has a first partial surface 11 with an area of $((259\ mm)^2-(259\ mm-2*9\ mm)^2)*0.25*\pi=7.07*10^{-3}\ m^2$ with which the sheet of plastic foil 8 is adhered to the remainder of the lid 3, and a second partial surface 12 with an area A of $(259\ mm\ -2*9\ mm)^2*0.25*\pi=45.6*10^{-3}\ m^2$ with which the sheet of plastic foil 8 is not directly adhered to the remainder of the lid 3 and which extends over the openings 9.

The second partial surface 12 has a perimeter C of $(259\ mm\ -2*9\ mm)*\pi=0.76\ m$.

When the cover layer 10 is disregarded, the plastic foil 8 has a thickness of 60 μm and is made of PVC (Polyvinyl Chloride) with a tensile strength X of 19 MPa. Therefore, the sheet of plastic foil 8 has a tensile strength T of 19 MPa *60 μm=1140 N/m.

The plastic foil 8 has a dimensional stability, measured according to standard FINAT TM 14, of less than 0.1 mm in a transverse direction and less than the measurement threshold in the longitudinal direction.

The plastic foil 8 is provided with an adhesive layer with an adhesive force of 18 N/25 m, measured according to standard FINAT TM 1, after 24 hours, on stainless steel.

Figure 4:
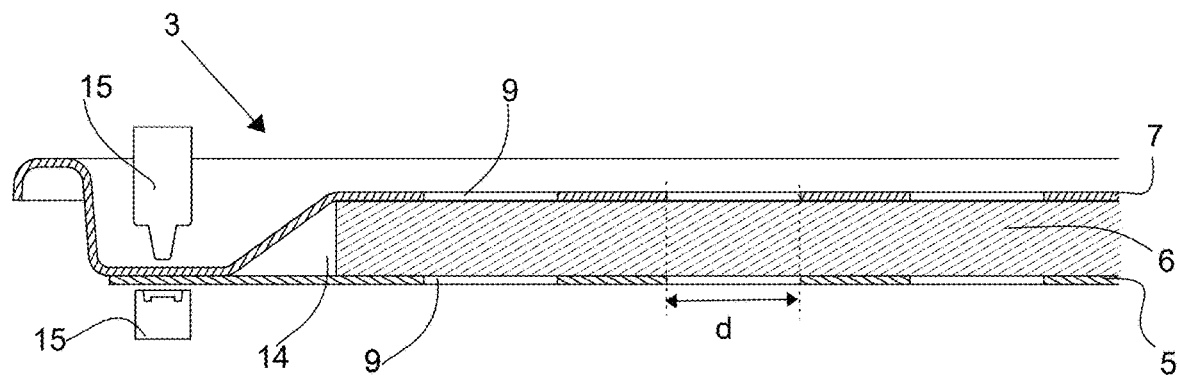
FIGS. 4 to 6 illustrate successive states, shown in cross-section along IV-IV, in the manufacture of a part of the drum of FIGS. 1 and 2.
Figure 5:
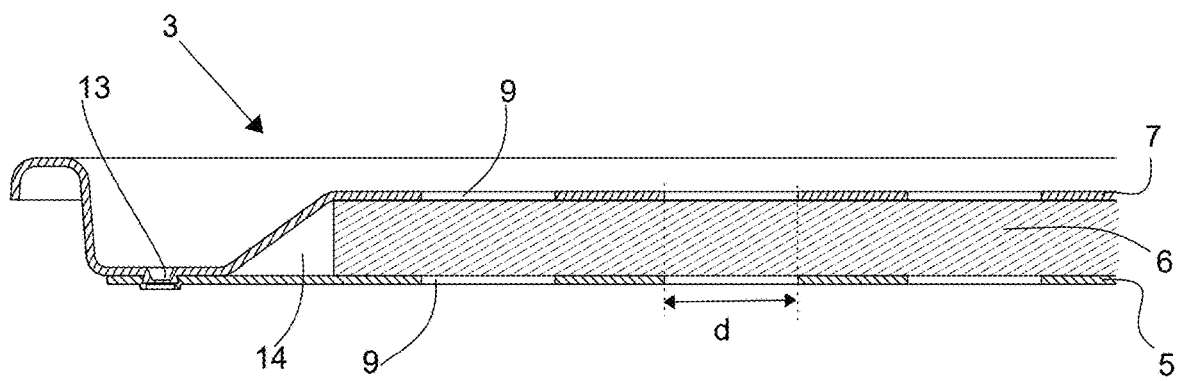
Figure 6:
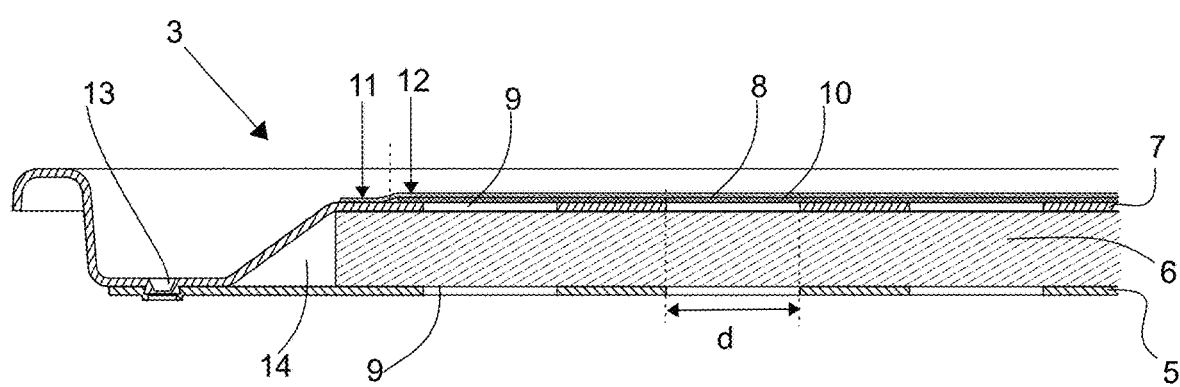

The lid 3 can be easily manufactured in the following manner, which is schematically shown in FIGS. 4 to 6.

First, the bottom plate 5 and the top plate 7, with the layer of steel wool 6 in between, are correctly positioned relative to each other.

Subsequently, by means of clinching, the top plate 7 and the bottom plate 5 are fixed to each other at four attachment points 13. The layer of steel wool 6 is hereby permanently fixed in a closed cavity 14 between the top plate 7 and the bottom plate 5. Clinching is a known technique in which point-shaped deformations of sheet material are made by cold pressing between two tools 15 formed for this purpose, in order thereby to make connections between sheet materials.

The situation before clinching is shown in FIG. 4, and the situation after clinching is shown in FIG. 5.

Subsequently, a custom-made sticker made of the plastic foil 8 and having a cover layer 10 is taken, the outermost 9 mm of the cover layer 10 is removed, and the sticker is adhered to the top plate 7. This is shown in FIG. 6.

The drum 1 can be used to collect used batteries at collection points, whether or not placed in a decorative casing.

When these batteries are to be transported to a processing location, the lid 3 is placed onto the drum body 2 and secured with a tightening ring, not shown.

The sheet of plastic foil 8 hereby prevents rainwater from entering the drum 1 during transport and/or storage, pending processing.

If the batteries in the storage area should ignite, internal pressure will be created due to the evolving gases and the increased temperature.

At a given moment, this will cause the sheet of plastic foil 8, at the transition between the adhered part and non-adhesive part, to tear, such that the gases can escape through the openings 9 and through the tear or tears that have developed in the sheet of plastic foil 8, before the drum 1 explodes.

The pressure at which the sheet of plastic foil 8 will tear can be calculated as follows, or at least can be approximated.

As described above, the plastic foil sheet 8 has a tensile strength of 1140 N/m, and the second partial surface 12, which is not adhered, has a perimeter of 0.76 m. This means that the plastic foil sheet 8 can withstand a total force on the second partial surface 12 of 1140*0.76=866 N before tearing.

Such a force is exerted if the pressure inside the drum times the area of the second partial surface 12, which is not adhered, is also 866 N. Since the area A of the second partial surface 12 is equal to $45.6*10^{-3}$ m$^2$, the pressure at which this force is exerted is equal to $866N/45.6*10^{-3}$ m$^2$, which is equal to 18985 Pa.

This is approximately a factor of 2.5 below the maximum pressure for which the drum 1 is designed, such that the sheet of plastic foil 8 will tear before the pressure in the drum 1 becomes too high.

The hot and possibly burning reaction gas which is formed during such an ignition of batteries flows through the layer of steel wool 6 and is cooled by the layer of steel wool 6, such that flames are extinguished by cooling by the steel wool 6 and no flames exit the drum 1.

As a result, the drum 1 is ideally suited for the safe transport of used batteries on a road vehicle or a rail vehicle and for the safe storage of used batteries, because no explosion of the drum 1 will occur and because no flames will exit the drum 1.

Because, due to the epoxy resin coating, no short-circuit can occur via the walls of the drum 1, it is not necessary to place a plastic inner bag inside the drum 1 before putting used batteries in it.

The invention claimed is:

1. A drum for transporting and/or storing batteries, comprising:
    a drum body;
    an internal storage space inside the drum body, the storage space having a volume; and
    a lid to close off the storage space,
    wherein the lid is provided with two or more groups of openings for venting gas from the storage space to the atmosphere, in which a first group of openings is present on a top plate positioned above a bottom plate, and a second group of openings is present on the bottom plate adjacent to the drum body's internal storage space, and wherein a sheet of foil covers the first group of openings of the two or more groups of openings, wherein the sheet of foil is attached to the lid completely around the first group of openings; and
    a layer of gas-permeable flame-retardant material extends across each of the two or more groups of openings,
    wherein the sheet of foil has a first partial surface with which the sheet of foil is attached to the lid, wherein the sheet of foil has a second partial surface which is completely surrounded by the fire t partial surface, the second partial surface having a perimeter C and an area A, wherein the lid of the drum is circular with a diameter (D) of 0.45 m or less, wherein (A/C)>0.035 m.

2. The drum of claim 1, wherein the sheet of foil is attached to the lid by being adhered to an outer side of the lid.

3. The drum of claim 2, wherein the sheet of foil is a sticker with a cover layer, the cover layer being removed at the locations where the sheet of foil is attached to the lid.

4. The drum of claim 1, wherein the lid has an inner side facing the storage space when the lid closes off the storage space, wherein the sheet of foil is designed to tear or to break if the difference between the pressure on an-the inner side of the lid and the atmospheric pressure is greater is than a threshold value.

5. A drum for transporting and/or storing batteries, comprising:
    a drum body;
    an internal storage space inside the drum body, the storage space having a volume; and
    a lid to close off the storage space,
    wherein the lid is provided with two or more groups of openings for venting gas from the storage space to the atmosphere, in which a first group of openings is present on a top plate positioned above a bottom plate, and a second group of openings is present on the bottom plate adjacent to the drum body's internal storage space, and wherein a sheet of foil covers the first group of openings of the two or more groups of openings, wherein the sheet of foil is attached to the lid completely around the first group of openings;
    and a layer of gas-permeable flame-retardant material extends across each of the two or more groups of openings wherein the gas-permeable flame-retardant material is made of steel fibers or mineral fibers, and
    wherein the layer of gas-permeable flame retardant material is a mass that is at least 0.75 grams per liter of volume of the storage space, whereby the average diameter of the steel fibers or mineral fibers is at most 0.5 mm, wherein the gas-permeable flame-retardant material has a porosity of at least 80%, wherein the gas-permeable flame-retardant material is a steel wool, a mineral wool, a textile made of said steel fibres or a textile made of said mineral fibres.

6. The drum of claim 5, wherein the top plate and the bottom plate are both made of steel.

7. The drum of claim 1, wherein the drum body has an inner side facing the storage space, and the drum body is provided on the inner side with an epoxy resin coating.

8. The drum of claim 7, wherein the lid has an inner side facing the storage space, and when the lid closes off the storage space the lid's inner side is includes an epoxy resin coating.

9. The drum of claim 1, wherein the storage space is at least partially filled with batteries, wherein the storage space is closed off by the lid, wherein the quantity of batteries is at least 0.1 kg per liter volume of the storage space.

10. The drum of claim 1, wherein said two or more groups of openings have a total surface area of at least 1.0 square centimeter per liter of volume of the storage space.

11. A drum for transporting and/or storing batteries, comprising:

a drum body;
an internal storage space inside the drum body, the storage space having a volume; and
a lid to close off the storage space,
  wherein the lid has an inner side facing the storage space when the lid closes off the storage space,
  wherein the lid has an outer side facing away from the storage space when the lid closes off the storage space,
  wherein the lid is provided with openings for venting gas from the storage space to the atmosphere, wherein a sheet of foil covers the openings, wherein the sheet of foil is attached to the lid completely around the openings, wherein the sheet of foil is attached to the lid by being adhered to the outer side of the lid, wherein the sheet of foil is designed to tear or to break if a difference between a pressure on the inner side of the lid and the atmospheric pressure is greater is than a threshold value, and
  wherein the sheet of foil has a first partial surface with which the sheet of foil is attached to the outer side of the lid, wherein the sheet of foil has a second partial surface which is completely surrounded by the first partial surface, the second partial surface having a perimeter C and an area A, wherein the lid of the drum is circular with a diameter (D) of 0.45 m or less, where; (A/D)>0.035 m.

12. The drum of claim 11, wherein the threshold value equals 50000 Pa or less.

13. The drum of claim 11, wherein the second partial surface is not adhered to the outer side of the lid.

* * * * *